Nov. 7, 1961 V. R. EXLEY ET AL 3,007,537
STEERING LINKAGE
Filed March 11, 1958 2 Sheets-Sheet 2
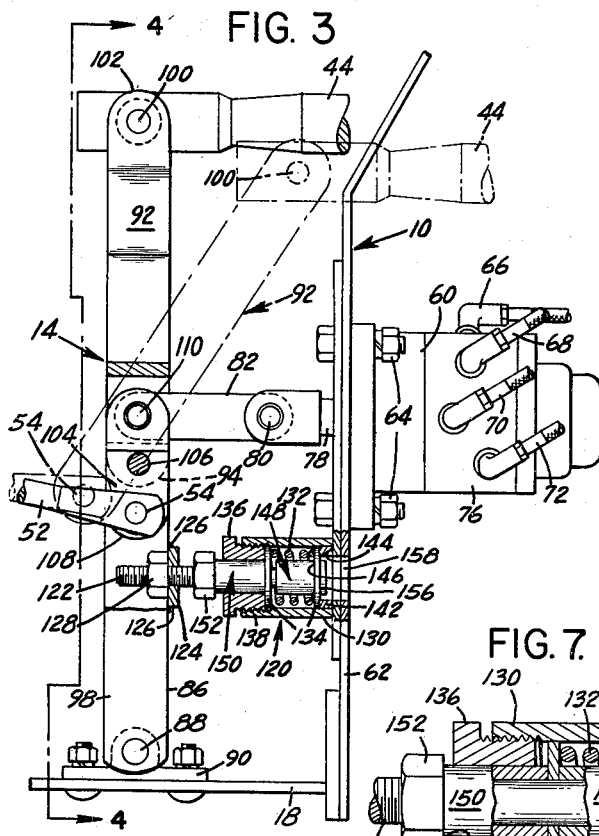
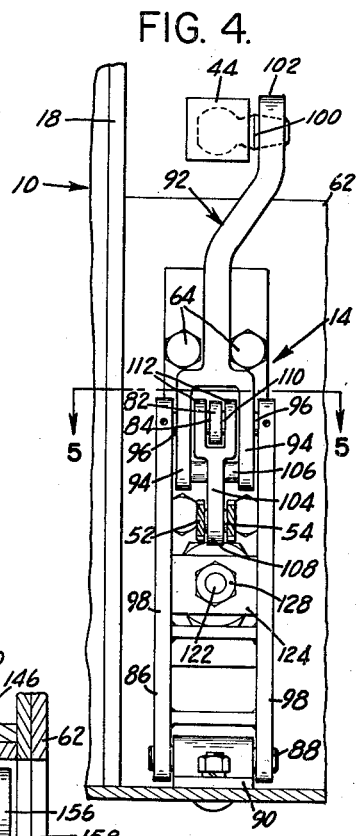
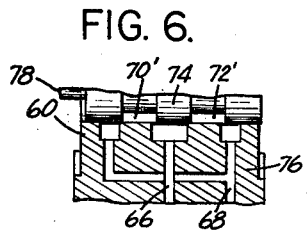
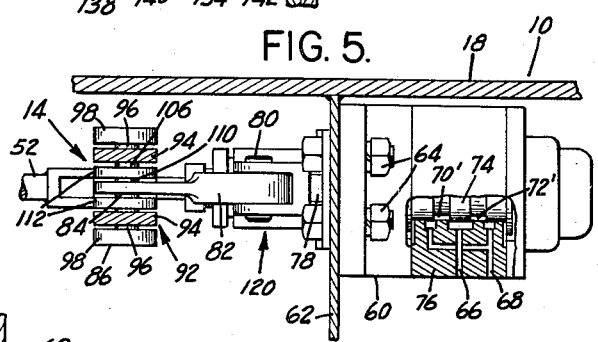
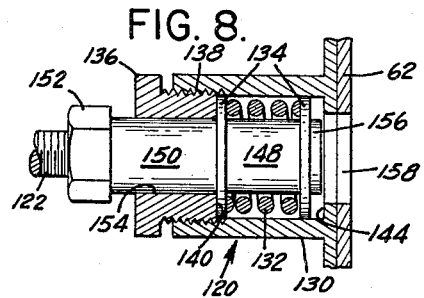
INVENTORS:
VERN R. EXLEY
RICHARD J. HOPKINS
BY Charles F. Osgood,
ATTORNEY

United States Patent Office 3,007,537
Patented Nov. 7, 1961

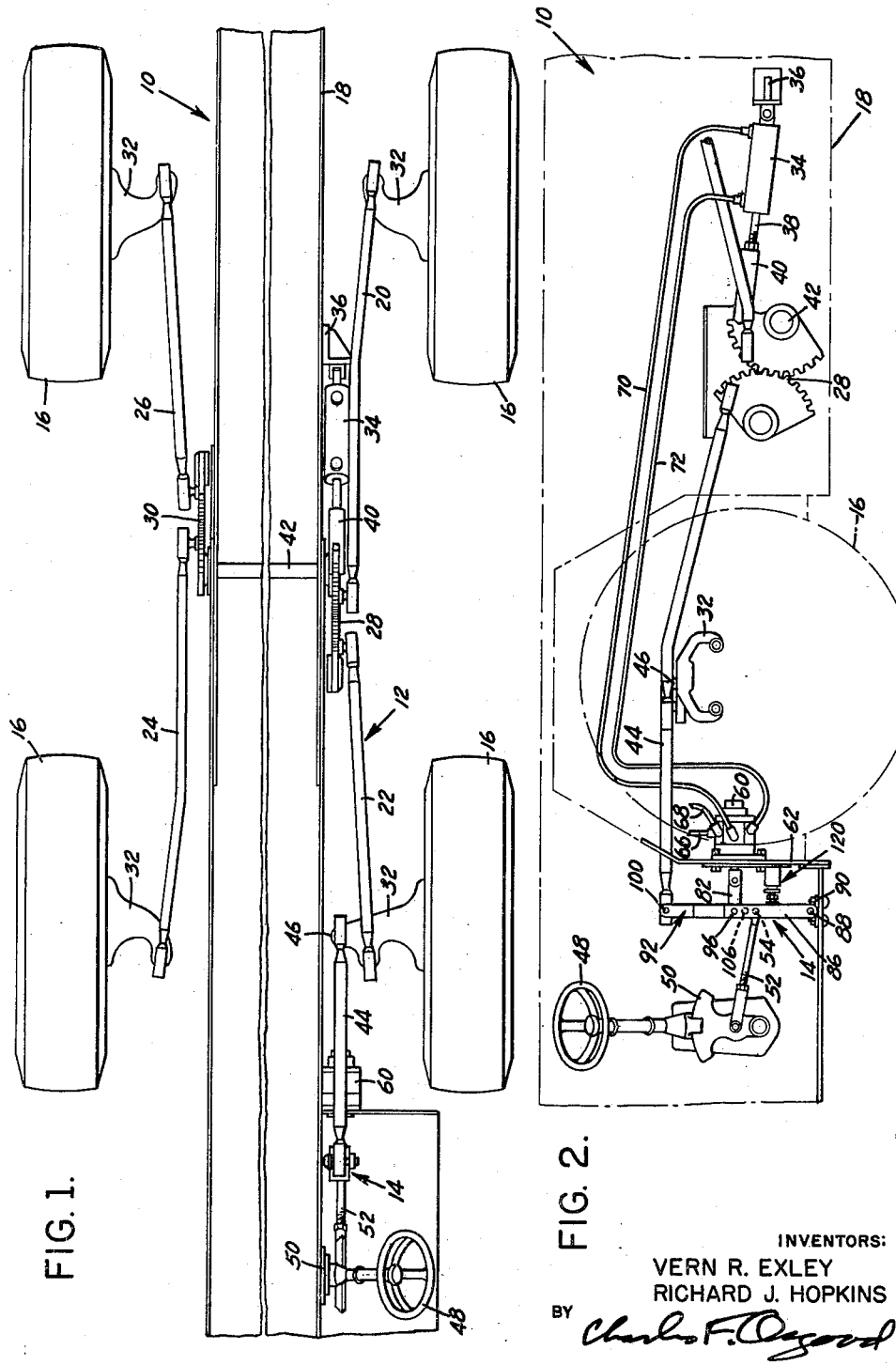

3,007,537
STEERING LINKAGE
Vern R. Exley and Richard J. Hopkins, Franklin, Pa., assignors to Joy Manufacturing Company, Pittsburgh, Pa., a corporation of Pennsylvania
Filed Mar. 11, 1958, Ser. No. 720,754
3 Claims. (Cl. 180—79.2)

This invention relates to power assisted steering means for vehicles and more particularly to linkage means tying the steering wheel linkage, hydraulic control valve and drag linkage means extending to a power cylinder and the steerable ground engaging wheels together in such a manner as to give fast, sensitive, positive steering and, eliminating steering flutter or chatter and which also provides for manual steering when the hydraulic system is not functioning.

With heavy two-wheel, four-wheel or more steer wheel systems for heavy vehicles using power steering, major shortcomings have been flutter or chatter with the hydraulic power steering system, excessive manual effort required to steer even with power steering, and with many vehicles an inability to steer when the hydraulic power system is not functioning. This steering chatter, a problem of long standing, has been cured by us in the past only by the use of orifices in the hydraulic system to, in effect, dampen out steering chatter. However, when meeting the problem of steering chatter in this manner, steering speed, sensitivity and positiveness have to some degree been sacrificed.

Our improved steering linkage means eliminates steering chatter without sacrificing sensitivity, speed and positiveness of response in steering. This is accomplished primarily by a pivoted link connecting the steering wheel linkage, the hydraulic steering control valve and the drag linkage means to the power cylinder and the ground engaging steerable wheels. In addition, any tendency of chatter to be transmitted back through the drag linkage and steering linkage means to the hydraulic steering control valve is also dampened by spring vibration dampening means between the vehicle frame and a pivotally vehicle frame mounted support mount for the pivoted link. This pivoted linkage system also provides for manual steering from steering wheel linkage to the drag links connected to the ground engaging steerable wheels when the hydraulic power steering system is not functioning.

It is therefore a major object of the present invention to provide pivoted link means operatively connecting steering wheel linkage, a hydraulic steering control valve and drag linkage means to a steering power cylinder and the steerable ground engaging wheels which eliminates steering flutter or chatter and at the same time gives fast, sensitive, positive steering instead of sacrificing such desirable steering features as has been the case when in the past orifices have been used in the hydraulic power steering system to minimize steering chatter.

Another object is to provide a mount means pivotally fastened at its base to the vehicle frame in which the pivoted link outlined in the above object is pivotally mounted and which is provided with vibration dampening by spring dampening means operatively positioned between the mount means and the vehicle frame.

A further object is to provide in a power steering system for vehicles a pivotal link mounted on the vehicle frame by pivotally mounted mount means through which manual steering effort is transmitted to drag linkage means for steering ground engaging wheels.

Further objects and advantages will appear from the following description and appended claims when read in conjunction with the attached drawings, wherein:

FIG. 1 is a partially detailed plan view of a vehicle showing particularly the detail of a hydraulic power steering system into which our new improved steering linkage means is incorporated.

FIG. 2 is a partial side view showing greater detail of the hydraulic power assisted steering system of FIG. 1.

FIG. 3 is an enlarged partial side view of the portion of the steering means of FIGS. 1 and 2 incorporating our steering linkage means improvements.

FIG. 4 is an end view of the steering linkage means of FIG. 3 taken on the line 4—4 of FIG. 3.

FIG. 5 is a partial plan view of the steering linkage means of FIGS. 3 and 4 taken on the line 5—5 of FIG. 4, and also showing, through a cutaway, the valve spool of the hydraulic control valve as positioned in the valve for neutral.

FIG. 6 illustrates the spool of a hydraulic steering control valve shifted to one limit for corresponding actuation of the power steering cylinder.

FIGS. 7 and 8 show the two operative limit positions in respective cutaway and sectioned views of the spring dampening means which is shown in the neutral state in a cutaway and sectioned portion of FIG. 3 and to be operatively connected between the vehicle frame and the steering pivotal link mount means which is pivotally attached to the vehicle frame.

The vehicle 10 has a power assisted steering system 12 which includes our improved steering linkage means 14. Steerable wheels 16 are connected to the body or frame 18 by a suspension means not shown. Steering system drag links 20, 22, 24 and 26 extend from motion reversing means 28 and 30 on their respective sides of the vehicle 10 to respective steering arms 32. Double acting fluid power cylinder 34 which is mounted by mounting means 36 to vehicle body 18 has a piston rod 38 operatively connected by member 40 to motion reversing means 28. Torque rod 42 extends transversely across vehicle body 18 from motion reversing means 28 to motion reversing means 30 at opposite sides of the vehicle.

Drag link 44 which acts as a motion feedback to steering linkage means 14 extends from projection 46 of the steering arm 32 to the steering linkage means 14. Drag link 44 also acts as a positive steering connection from steering linkage means 14 to projection 46 of the respective steering arm 32 for manual steering when the hydraulic system is out. A conventional steering wheel 48 and steering gear means 50 are provided with an adjustable length rod connecting means 52 which is pivotally connected at 54 with our improved steering linkage means 14.

A hydraulic control valve 60, which is mounted to flange 62 of vehicle body 18 by nut and bolt assemblies 64, is provided with a fluid inlet line 66, a fluid outlet line 68 and valve control lines 70 and 72 which extend to and are connected with opposite ends of the double acting fluid cylinder 34. Hydraulic fluid valve 60 is a spool type valve in which minute axial displacement of spool 74 within valve housing 76 is effective to direct fluid pressure to one and exhaust the other of the fluid lines 70 and 72. Rod 78 projects from valve spool 74 through flange 62 to a pivotal connection 80 with valve link member 82 which has a pivotal connection 84 at its other end with steering linkage means 14.

Steering linkage means 14 is provided with an H-frame member or linkage 86 pivotally mounted at 88 at the bottom to vehicle body 18 by mount means 90. Steering linkage means 14 is also provided with a fork link member 92 each fork 94 of which is pivotally mounted by a pivot pin means 96 within the respective side plates 98 of H-frame 86. Fork link member 92 is pivotally connected at 100 at its upper end 102 with drag link 44. Pivotal link member 104 is pivotal at its center about a rod 106 which extends between the end forks 94 of fork link member 92. The pivotal connection 54 of rod connecting means 52 with steering linkage means 14 is at the lower end 108 of pivoted link member 104. The pivotal connection 84 of valve link member 82 with steering linkage means 14 is a connection with rod 110 which extends between forks 112 of the upper forked end of pivotal link member 104.

The power assisted powering system 12 comes into operation when, for example, steering wheel 48 is rotated in a clockwise direction for a right turn. When this is done rod connecting means 52 is pulled to the left (referring to FIGURE 2) by steering gear means 50. Pivotal link member 104 is pivoted in a clockwise direction thereby about the rod 106 to give valve link member 82 and valve spool 74 movement to the right. A hydraulic fluid valve 60 such as shown here is effective to direct fluid pressure to one and exhaust the other of fluid lines 70 and 72 when the spool is moved 15 to 20 thousandths of an inch in either direction from a neutral position such as the neutral spool position shown in FIGURE 5. When valve spool 74 is moved to the right for a right turn as above, valve passage means 72' and line 72 are connected to outlet line 68 and valve passage means 70' and line 70 are connected to the fluid pressure inlet line 66. Thus, with the left end of douable acting fluid power cylinder 34 exhausted by line 72 and the right end under fluid pressure the piston rod 38 will be moved towards the left and the steering wheels will be turned by the respective motion reversing means 28 and 30 and drag links 20, 22, 24 and 26 and in addition the drag link 44 will be moved toward the right as seen in FIGURES 2 and 3. Movement of drag link 44 and the top of forked link member 92 to the right pivots forked link member 92 about the pivot pin means 96. This carries rod 106, about which link member 104 pivots, to the left as seen in FIGURE 3 till turning of steering wheel 48 is stopped when continued motion of drag link 44, forked link member 92 and link member 104 as driven by double acting power cylinder 34 returns valve spool 74 to the neutral position shown in FIGURE 5. When steering wheel 48 is rotated in a counterclockwise direction for a left turn the movements and operations of steering system components occur in reverse, but otherwise, the same as outlined above.

Vibrations transmitted from the steerable wheels 16 to the vehicle steering system 12 during travel of vehicle 10 and any resilient vibrations picked up and/or originating in power assisted steering system 12 may be transmitted in some degree to and through drag link 44 to our improved steering linkage means 14. With many existing steering linkage systems these vibrations would be transmitted directly through steering linkage means to a fluid control valve such as hydraulic fluid valve 60 giving rise to a flutter or chatter condition in the steering system. Such a flutter or chatter condition is particularly bad at times when the control from the fluid control valve to the power cylinder accentuates reversing actuation of a double acting power cylinder to give a toned frequency reversing response and feedback condition. Such vibrations in our improved steering linkage means 14 are substantially eliminated as they are divided and dampened by having to pass through multiple pivotal linkage components in the system. More explicitly, flutter and chatter vibration in the system is minimized by feedback motion of the steering system having to be transmitted from fork link member 92 partially to and dissipated in H-frame member or linkage 86 and partially to pivot link member 104 where the feedback movement forces remaining are balanced between the rod connecting means 52 from the steering gear means 50 and through valve link member 82 to the valve spool 74. In addition, a spring dampening means 120 provides for resilient absorption and dampening of chatter vibration and shock feedback movement components transmitted to H-frame 86.

When the hydraulic power system is out manual steering is accomplished through our improved steering linkage means 14 when making a right turn in the following manner. Rod connecting means 52 is pulled to the left as seen in FIGURES 2 and 3 by steering means 50. This pivots pivotal link member 104 about rod 110 after valve link member 82 and valve spool 74 have moved the 15 to 20 thousandths of an inch travel limit to the right from the valve spool neutral position. This pivoting of pivoted link member 104 about rod 110 carries rod 106 which extends through the center of pivotal link member 104 to the left. It follows that, since rod 106 extends between and is fastened to end forks 94, the forked link member 92 is in turn pivoted about the pivot pin means 96 connections with respective side plates 98 of H-frame or linkage 86. At the same time, upper pivotal connection 100 at the upper end 102 of forked linked member 92 and drag link 44 are moved to the right to positions such as shown in phantom in FIGURE 3.

Spring dampening means 120, which resiliently stabilizes H-frame or linkage 86 by resiliently absorbing and dissipating portions of vibration and shock movement transmitted to the H-frame, is mounted to flange 62 of vehicle body 18 and has a threaded rod 122 which is adjustably threaded through plate 124. Plate 124 which extends across between side plates 98 of H-frame 86 is held in place by welding 126. A lock nut 128 is used for locking the adjusted position of the threaded rod 122. Housing 130 of spring dampening means 120 contains a spring 132 and two thrust washers 134 one at each end of the spring 132. Housing end member 136 is threaded at 138 into housing 130 and provides an adjustably positioned end abutment 140 for one of the thrust washers 134. In the embodiment of FIGURES 3 and 7, abutment ring 142 which abuts housing shoulder 144 provides an end abutment surface 146 for the other thrust washer 134, and in the embodiment of FIGURE 8 housing shoulder 144 is the end abutment for a thrust washer 134.

Tubular spacer 148 on threaded rod 122 between thrust washers 134 within housing 130 establishes the minimum spacing for compression of spring 132. An additional tubular spacer 150 on threaded rod 122 between an adjustment nut 152 which is threaded on threaded rod 122 and one of the thrust washers 134 is axially slidable through opening 154 of housing end member 136. Threaded rod 122 is provided with an end flange 156 for operational thrust engagement with a thrust washer 134. Opening 158 which extends through an end of housing 130 and body flange 62 provides for assembly of threaded rod 122 into spring dampening means 120 and, in the embodiment of FIG. 8, room for the operational axial movement of end flange 156.

Adjustments of threaded rod 122 with respect to plate 124, housing end member 136 and adjustment nut 152 are such that when H-frame 86 is moved to the right (as seen in FIG. 3) threaded rod 122 is moved to the right. This movement is transmitted through adjustment nut 152, tubular spacer 150 and a thrust washer 134 to and resiliently resisted by spring 132. Further movement of H-frame 86 and threaded rod 122 to the right is stopped when adjustment nut 152, tubular spacer 150, thrust washers 134, tubular spacer 148 and, in the embodiment of FIGS. 3 and 7, abutment ring 142 are in respective tight abutment bearing against housing shoulder 144. Movement of H-frame 86 and threaded rod 122 to the left is transmitted from end flange 156 through a thrust washer 134 to and resiliently resisted by spring 132. Further movement of H-frame 86 and threaded rod 122 to the left is stopped when end flange 156, thrust washers 134, and tubular spacer 148 are in respective tight abutment bearing against end abutment 140 of housing end member 136 as shown in FIG. 8.

The adjusted position of housing end member 136 determines the degree of permissible movement, equal to the left and right, of H-frame 86 and threaded rod 122 from the resiliently stabilized state of FIG. 3. If desired, adjustment nut 152 may be tightened down more than is shown in FIG. 3, in which case, the total range of permissible movement for the H-frame 86 and threaded rod 122 would remain the same. However, there would be a range of unrestrained movement before movement of the H-frame 86 and threaded rod 122 to the right and to the left would be resiliently resisted by spring 132. It would be possible to remove the resilient effect of spring 132 completely by tightening adjustment nut 152. If adjustment nut 152 is tightened less than in FIG. 3, there is a range of unresisted floating movement of H-frame 86 and threaded rod 122 determined by the adjusted position of adjusting nut 152 after which further movement to the left or the right as the case may be is resiliently resisted by spring 132 to the degree determined by the adjusted position of housing end member 136 in housing 130.

We have herein provided improved steering linkage means which operatively connects the steering wheel linkage, a hydraulic control valve, drag linkage and associated steering means to a double acting power cylinder and steerable ground engaging wheels together in such a manner as to give fast, sensitive, positive steering and, eliminating steering flutter or chatter. It is an improved steering linkage means, which in addition to the above outlined features, also provides for manual steering when the hydraulic system is not functioning. We provide multiple pivotally interconnected linkage members which divide and dampen vibration and shock feedback movements. In addition, we also provide a pivot link mount means pivotally mounted to a base which is provided with vibration dampening by double acting resilient spring damping means also mounted to a base.

While we have shown and described certain embodiments of our invention, various changes and modifications may be effected without departing from the spirit and scope of the invention as defined in the appended claims.

What we claim as new and desire to secure by Letters Patent is:

1. A steering mechanism for a vehicle having a frame member with ground supporting means including steerable wheels, an inner lever pivotally mounted intermediate its ends to one end of an outer lever that is secured to said frame, a pivoted link pivotally connected intermediate its ends to one end of said inner lever, one end of said pivoted ilnk having input means for pivoting said pivoted link, valve means mounted on said frame having pivotal connecting means connected to the other end of said pivoted link, a power device mounted on said frame having said valve means operatively connected thereto, said steerable wheels operatively connected to the output of said power device for steering the vehicle, said steerable wheels having linkage means operatively connected to the other end of said inner lever for a feedback control wherein said pivotal mounting for said inner lever is concentric with said pivotal connecting means for said other end of said pivoted link.

2. A steering mechanism for a vehicle having a frame member with ground supporting means including steerable wheels, an inner lever pivotally mounted intermediate its ends to one end of an outer lever that is secured to said frame, a pivoted link pivotally connected intermediate its ends to one end of said inner lever, one end of said pivoted link having input means for pivoting said pivoted link, valve means mounted on said frame having pivotal connecting means connected to the other end of said pivoted link, a power device mounted on said frame having said valve means operatively connected thereto, said steerable wheels operatively connected to the output of said power device for steering the vehicle, said steerable wheels having linkage means operatively connected to the other end of said inner lever for a feedback control wherein said pivotal mounting for said inner lever is concentric with said pivotal connecting means for said other end of said pivoted link wherein said outer lever has the other end pivotally mounted to said frame member, and dampening means connecting said outer lever intermediate its said ends to said frame member for suppressing vibration in such a steering mechanism.

3. A steering mechanism for a vehicle having a frame member with ground supporting means including steerable wheels, an inner lever pivotally mounted intermediate its ends to one end of an outer lever that is secured to said frame, a pivoted link pivotally connected intermediate its ends to one end of said inner lever, one end of said pivoted link having input means for pivoting said pivoted link, valve means mounted on said frame having pivotal connecting means connected to the other end of said pivoted link, a power device mounted on said frame having said valve means operatively connected thereto, said steerable wheels operatively connected to the output of said power device for steering the vehicle, said steerable wheels having linkage means operatively connected to the other end of said inner lever for a feedback control wherein said pivotal mounting for said inner lever is concentric with said pivotal connecting means for said other end of said pivoted link wherein said outer lever has the other end pivotally mounted to said frame member, and dampening means connecting said outer lever intermediate its said ends to said frame member for suppressing vibration in such a steering mechanism wherein said dampening means includes an adjustable spring device having limited reciprocal movement therein.

References Cited in the file of this patent

UNITED STATES PATENTS

| 1,454,396 | McDonald | May 8, 1923 |
| 1,928,816 | Grayson | Oct. 3, 1933 |
| 1,991,597 | Davidson | Feb. 19, 1935 |
| 2,141,697 | Russell | Dec. 27, 1938 |
| 2,195,932 | Maloney et al. | Apr. 2, 1940 |
| 2,429,185 | Hukill | Oct. 14, 1947 |
| 2,765,042 | Day | Oct. 2, 1956 |
| 2,783,849 | Armington et al. | Mar. 5, 1957 |
| 2,797,764 | Wysong et al. | July 2, 1957 |

FOREIGN PATENTS

| 747,960 | France | June 27, 1933 |